March 7, 1944.  R. SYERS  2,343,591
PROCESS FOR SEPARATING SULPHUR FROM TAR
Filed Oct. 28, 1941
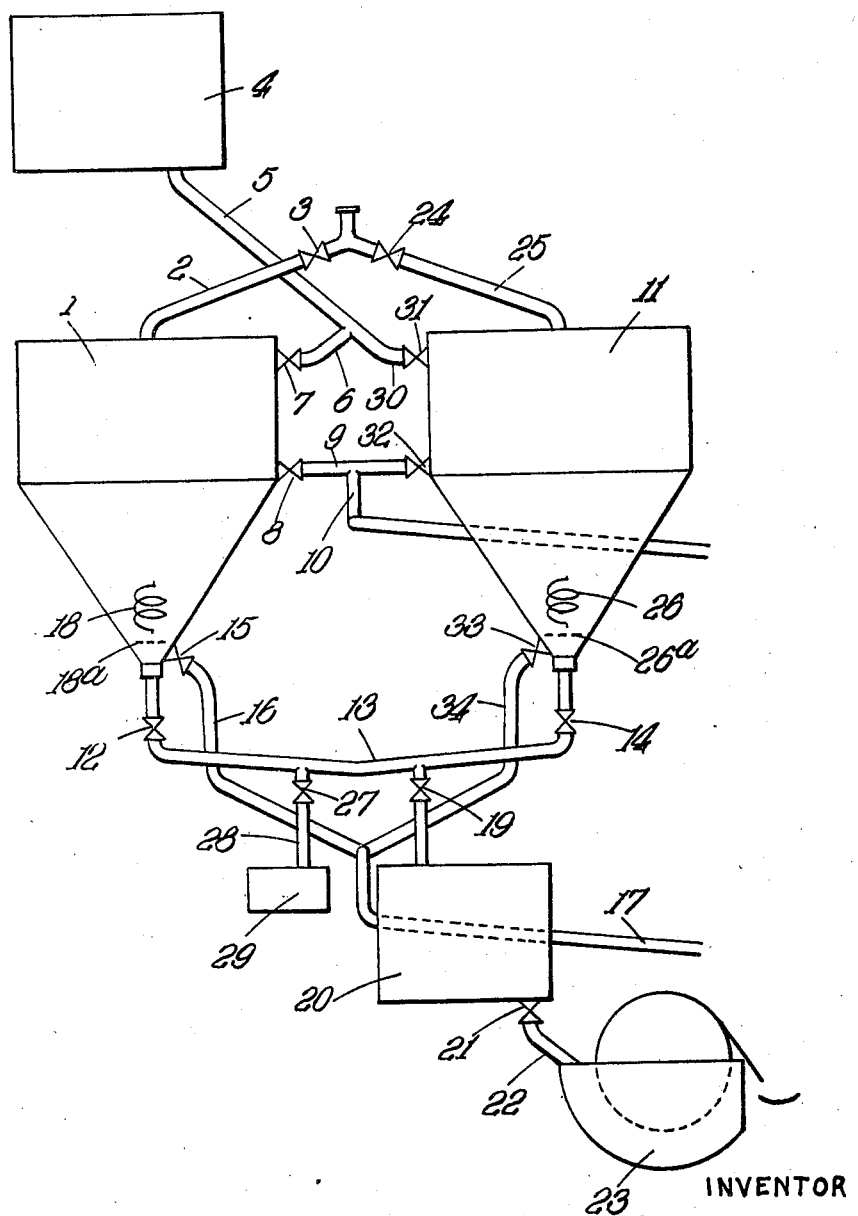
INVENTOR
ROLAND SYERS
BY
Young, Emery & Thompson
ATTYS.

Patented Mar. 7, 1944

2,343,591

UNITED STATES PATENT OFFICE 2,343,591

PROCESS FOR SEPARATING SULPHUR FROM TAR

Roland Syers, London, England, assignor to F. W. Berk and Company Limited, London, England Application October 28, 1941, Serial No. 416,917
In Great Britain November 6, 1940

3 Claims. (Cl. 23—293)

This invention relates to the recovery of sulphur from homogeneous solutions having sulphur and tar dissolved therein the sulphur constituting the preponderating proportion of the solute.

It is an object of the present invention to provide a process whereby the sulphur is obtained in a substantially pure state and only a small proportion thereof is separated with the tar.

With this object in view the present invention provides a process for the recovery of sulphur from a homogeneous solution having sulphur and tar dissolved therein the sulphur constituting the preponderating proportion of the solute and being liquid at the temperature employed for its separation wherein the hot homogeneous solution is cooled to a temperature at which a liquid layer separates consisting of a small proportion of the total amount of sulphur present in the solution together with the bulk of the tar, the said liquid layer is separated and either the residual solution is cooled to a temperature at which substantially sulphur separates, or substantially pure sulphur is recovered from the solution by other means.

An embodiment of the invention will now be described by way of example. According to this embodiment sulphur is recovered from a solution thereof in tetrachlorethane which also contains a small proportion of tar such as the solutions obtained by the treatment of spent iron oxide used in the purification of coal gas for example in the manner described in my co-pending application No. 446,916.

This embodiment will now be described in greater detail by way of example with reference to the accompanying drawing which is a longitudinal sectional view of a suitable plant for carrying out the process.

Referring to the drawing, a boiling solution of sulphur and a small proportion of tar in tetrachlorethane obtained from spent oxide as described in my co-pending application No. 416,916 is introduced into the crystalliser 1 and redistilled tetrachlorethane is introduced through the line 2 and valve 3 until the sulphur content of the solution is about 30%. The crystalliser 1 is provided with a jacket for the admission of cooling liquids and cooling liquid is now admitted to the jacket from tank 4 via lines 5 and 6 and valve 7, the fluid leaving the jacket via valve 8 and lines 9 and 10.

The solution in the crystalliser 1 is now cooled to about 115° C. and it then separates into two layers, a bottom layer consisting of a solution of about 10% of tetrachlorethane in molten sulphur contaminated with tar which is run into the crystalliser 11 via valve 12, line 13 and valve 14. The top layer in the crystalliser 1 which consists of a solution of sulphur in tetrachlorethane is then cooled to about 60° C., sulphur crystallises, and the mother liquor is run off via valve 15, lines 16 and 17 to a storage tank. The crystalliser 1 is provided with a closed steam coil and this is now utilised together with open steam coil 18a to steam out the residue of tetrachlorethane and melt the sulphur, which runs via valve 12, line 13 and valve 19 to the tank 20 from whence it runs via the valve 21 and line 22 to the flaking machine 23. Alternatively the sulphur from the tank 20 may be cast into blocks.

The operations described above are now repeated several times until enough bottom layer sulphur has accumulated in the crystalliser 11 to allow a batch to be separated and crystallised. Redistilled tetrachlorethane is now run into the crystalliser 11 via the valve 24 and line 25 and the solution boiled by means of the closed steam coil 26. The bottom layer in this case consists of very contaminated sulphur and is run off via the valve 14, line 13, valve 27 and line 28 to the tank 29. In this case, during the crystallising cooling fluid is supplied via lines 5 and 30 and valve 31, leaving the jacket of the crystalliser 11 via the valve 32 and line 9. The mother liquors leave via valve 33 and lines 34 and 17 and the sulphur is recovered as in the case of crystalliser 1. In this case the steaming out is effected by means of the closed steam coil 26 together with open steam from coil 26a.

It will be understood that the lines will be steam jacketed where necessary to maintain the required temperature.

It is found that if tetrachlorethane is employed as the solvent it dissolves about 8% of tar calculated on the weight of the spent oxide and the tar contains about 10% of sulphur. Practically pure sulphur is obtained and only about 0.8% of the total sulphur is lost in the tar. The solvent can be recovered from the tar solution by steam distillation almost quantitatively and no vapour absorption plant is needed.

The sulphur which is obtained by the process contains less than 0.5% of tar and has the further advantage that the tar is non-volatile, that is to say, it does not distil or decompose on burning off the sulphur so long as molten sulphur is present.

I claim:

1. A process for the recovery of sulphur from a hot homogeneous solution having sulphur and tar dissolved therein the sulphur constituting the preponderating proportion of the solute which comprises cooling the hot homogeneous solution to a temperature at which a liquid layer separates from a residual solution of sulphur said layer consisting of a small proportion of the total amount of sulphur present in the solution together with the bulk of the tar, separating said liquid layer, and recovering sulphur from the residual solution.

2. A process for the recovery of sulphur from a hot homogeneous solution having sulphur and tar dissolved therein, the sulphur constituting the preponderating proportion of the solute, which comprises cooling the hot solution to a temperature at which a liquid layer separates from a residual solution of sulphur, said layer consisting of a small proportion of the total amount of sulphur present in the solution together with the bulk of the tar, separating the said liquid layer and cooling the residual solution to a temperature at which pure sulphur separates.

3. A process for the recovery of sulphur from a hot homogeneous solution of sulphur and tar in tetrachlorethane, the sulphur constituting the preponderating proportion of the solute which comprises cooling the hot solution to a temperature at which a liquid layer separates from a residual solution of sulphur, said layer consisting of a small proportion of the total amount of sulphur present in the solution together with the bulk of the tar, separating the said liquid layer and cooling the residual solution to a temperature at which pure sulphur separates.

ROLAND SYERS.